April 13, 1954  A. J. SPECHT  2,675,257
MATERIAL BORING AUGER
Filed Nov. 8, 1950
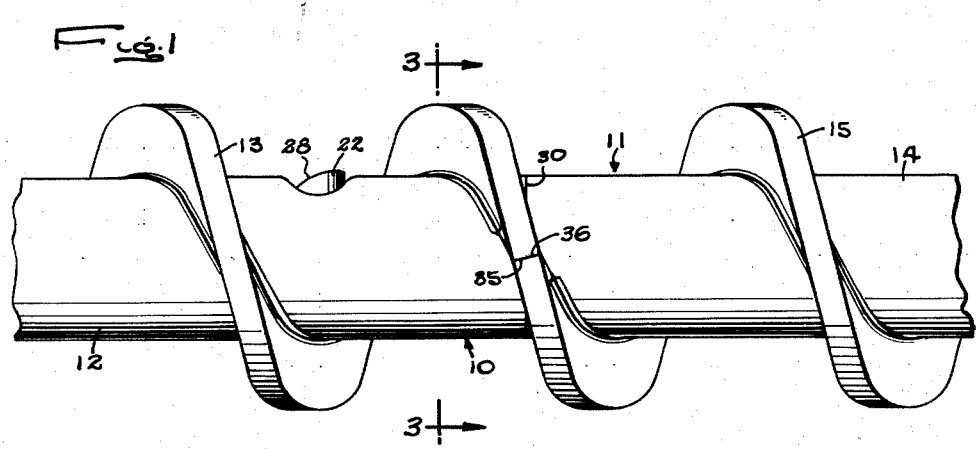
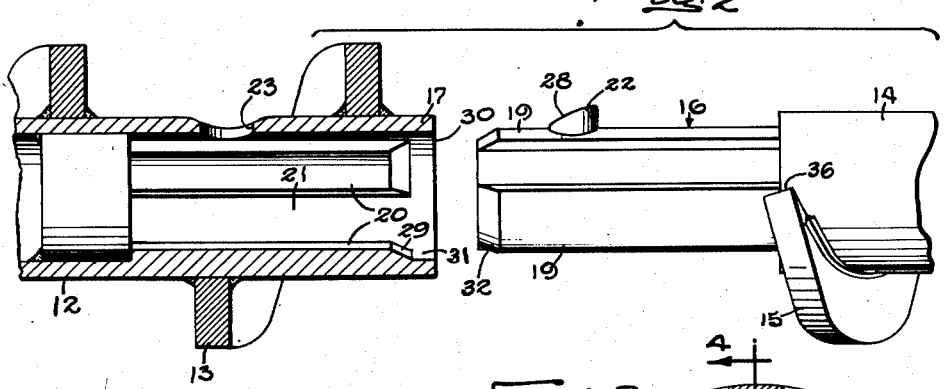
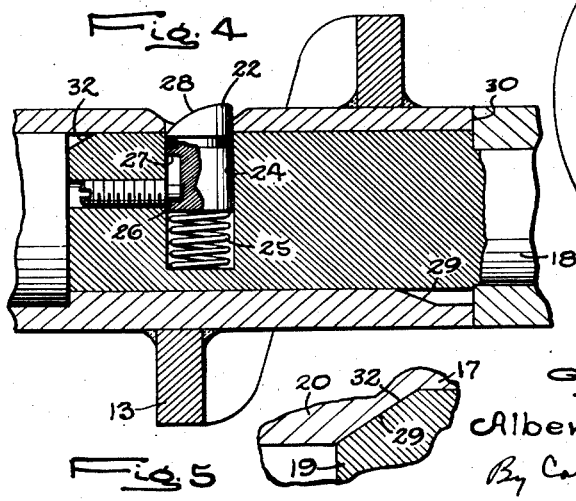
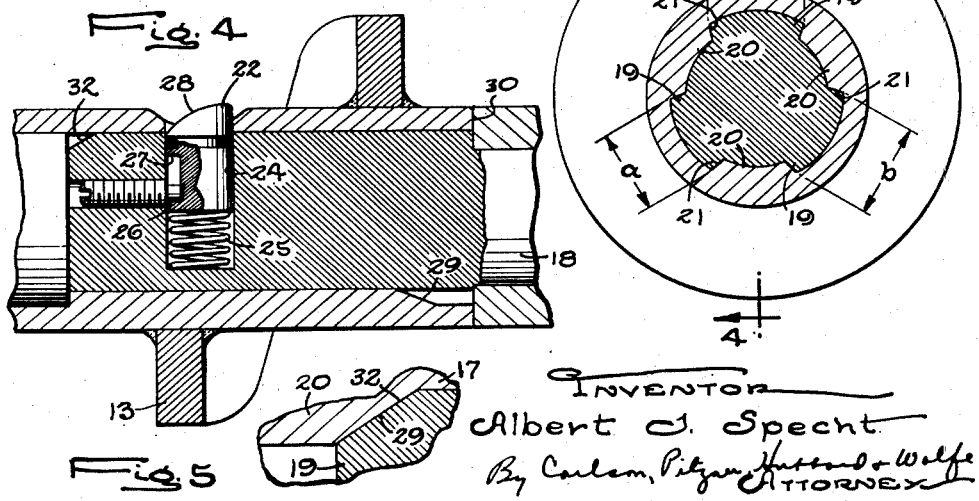
INVENTOR
Albert J. Specht
By Carlson, Pitzner, Hubbard & Wolfe
ATTORNEY Patented Apr. 13, 1954

2,675,257

UNITED STATES PATENT OFFICE 2,675,257

MATERIAL BORING AUGER

Albert J. Specht, Delavan, Wis.

Application November 8, 1950, Serial No. 194,591

3 Claims. (Cl. 287—119)

This invention relates to an auger of the type formed in sections adapted to be spline coupled together in a predetermined angular position in which external conveyor vanes or ribs extending helically around the peripheries of the sections are aligned with each other.

One object of the invention is to provide a novel construction and axial location of the end surfaces of the spline teeth on the two sections to facilitate initial entry of one section into the other section and proper alinement both radially and axially of the mating spline teeth and grooves on the two sections.

Another object is to construct the ribs of adjacent sections in a novel manner with circumferentially facing interengageable abutment surfaces thereon to facilitate the transmission of torque and the transfer of material along the auger from one section to the next adjacent section.

Other objects and advantages of the invention will become apparent from the following detailed description taken in connection with the accompanying drawings, in which:

Figure 1 is a fragmentary side elevation of an auger embodying the present invention.

Fig. 2 is an exploded view similar to Fig. 1 showing some of the parts in section.

Fig. 3 is a section taken along the line 3—3 of Fig. 1

Fig. 4 is a fragmentary sectional view taken along the line 4—4 of Fig. 3.

Fig. 5 is a fragmentary sectional view showing the parts in a different position.

In the drawings the invention is shown for purposes of illustration incorporated in a coupling for joining together two sections 10 and 11 of an auger used in boring relatively large holes in coal or other like material. One section 10 comprises a generally cylindrical member 12 having one or more conveyor vanes or thread-like ribs 13 extending helically around the latter and secured thereto as by welding. A similar cylindrical member 14 having one or more helical ribs 15 secured thereto comprises the other section 11. In this instance, the cylindrical members are in the form of tubes each having only one rib which terminates adjacent one end of the tube.

To couple the sections 10 and 11 together, a projection 16 on the end of one tube 14 constitutes a male portion adapted to be received and locked in a female portion 17 constituting the end portion of the other tube 12. Herein, the male portion is one end portion of a solid plug 18 having its other end pressed into the tube 14. Extending axially along the exterior of the male portion are a plurality of male spline teeth 19 which are complementary to axially extending teeth 20 on the interior of the female portion and are adapted to fit in the intervening grooves 21 between the female teeth. Preferably, there are three male teeth which are snugly received in the female grooves to provide full surface contact between the corresponding ones of the teeth on the male and female portions.

Locking of the sections 10 and 11 together to secure the same against axial movement relative to each other is effected in the present instance through the medium of a latch 22 in the male portion 16 spaced from the outer end of the latter and positioned to project into a radially opening hole 23 in the female portion 17 when the latch and hole are alined radially and the male and female portions are telescoped together. The latch is slidably mounted in a radial recess 24 in the male portion and is urged outwardly by a coiled spring 25 acting on its inner end, the range of movement being determined by the engagement between a pin 26 in the male portion and opposite ends of a longitudinally disposed slot 27 in the latch 22. By properly positioning the hole and the latch circumferentially relative to the respective ribs 13 and 15, the adjacent ends of the latter are always alined with each other as shown in Fig. 1, when the latch is received in the hole. Preferably, the outer end 28 of the latch is inclined inwardly toward the outer end of the male portion so as to be cammed inwardly upon engagement with the outer end of the female portion to facilitate entry of the male portion into the latter.

To insure that the male portion 16 may enter the female portion 17 in only one predetermined angular position from which the ribs 13 and 15 may be brought into alinement, certain of the teeth and complementary grooves of the spline coupling are made wider than the remaining teeth and grooves so that the same ones of the male teeth always enter the same ones of the female grooves 21. By properly positioning the latch 22 for alinement with the hole 23 when the male teeth register with the mating female grooves, the ribs are automatically alined in the only position in which the sections 10 and 11 of the auger may be assembled. In the present instance, only one of the male teeth is made narrower than the remaining male teeth. Thus, as shown in Fig. 3, the width, indicated at $a$ of one male tooth is narrower than the widths $b$ of the other two male teeth. With the complementing female grooves 21 having the same different widths as the male teeth, the portions 16 and 17 form a tightly fitting coupling and may be telescoped together only after the male portion has turned to the one angular position in which the male teeth register with the complementing female grooves.

To facilitate the intial entry of the male portion 16 into the female portion 17, it is desirable to space the outer ends 29 of the female teeth 20 inwardly from the outer end 30 of the female portion with the portion 31 of the latter disposed outwardly beyond the teeth having an internal diameter of substantially the same size as the outside diameter of the male teeth 19. Such positioning of the teeth ends and sizing of the female portion enables the male portion to be guided easily into the outer end portion of the female portion until the outer ends of the male and female teeth interengage.

In accordance with the invention, these interengaging teeth ends are constructed in a novel manner to relatively shift the male and female portions 16 and 17 transaxially of the auger to aline their axes and thereby facilitate telescoping of the portions when the teeth and mating grooves thereof are in register. For this purpose, the outer ends 29 of the female teeth are flared outwardly while the end surfaces 32 of the male teeth converge axially and inwardly toward the end of the male portion, preferably at a similar angle. With this arrangement, the female teeth ends in effect form a seat (see Fig. 5) which guides the male portion 16 into the proper radial position with respect to the female portion and in which the male portion may be turned relative to the female portion to aline the mating teeth and grooves of the portions.

The novel construction above described is especially suited for use in relatively dark places, such as in coal mines, where visibility is poor and the operator must fit the sections 10 and 11 of the auger together more through his sense of touch than through his sense of sight. In coupling together the sections of the auger, one section is grasped in each hand and the two sections are moved endwise toward each other until the outer end of the male portion 16 is received in the outer end portion 31 of the female portion 17. Due to the guiding action of the converging outer ends 32 of the male teeth, the male portion will easily enter into the outer end of the female portion and into seating engagement with the sloping end surfaces 29 of the female teeth as shown in Fig. 5.

With the male portion thus alined axially with the female portion and end pressure still being applied to the two sections, the latter are turned relative to each other until the teeth on one portion register with the mating grooves on the other portion as shown in Fig. 3. From this position in which the latch 22 and the hole 23 are automatically disposed in the same radial plane of the auger, the male teeth are moved endwise into the mating female grooves 21. In this movement, the latch is first cammed inwardly by the outer end of the female portion and then moved axially into radial alinement with the hole. As the latch and hole register (see Fig. 4), the latch moves under the action of the spring 25 radially outward into the hole to lock the sections together. At this time, the ribs 13 and 15 are alined because of the circumferential positioning of the latch and hole. To uncouple the male and female portions, the latch is merely depressed inwardly past the edges of the hole and the sections are pulled endwise away from each other.

The invention also contemplates constructing the ribs 13 and 15 in a novel manner to augment the torque transmitting capacity of the spline coupling and to facilitate the transfer of material along the auger from one of the sections 10 and 11 thereof to the other section. For this purpose, circumferentially facing abutment surfaces 35 and 36 are formed on the adjacent ends of the ribs with at least one of the latter extending axially beyond the end of its associated one of the cylindrical members 13 and 14 and into abutting engagement with the other rib when the sections are coupled together. In the present instance, each abutment surface lies in a plane disposed substantially radially with respect to the auger and the rib on each cylindrical member extends axially beyond the end of the latter so that the abutment surfaces both overlie the junction between the sections.

When the above described auger sections 10 and 11 are coupled together, the rib ends 35 and 36 engage each other as shown in Fig. 1 and form a rib which extends continuously from one section to the other to facilitate the transfer of material along the auger. By facing the rib ends circumferentially with respect to the auger and bringing them into abutting engagement, the ribs cooperate with the teeth of the spline coupling to enable a substantial torque to be transmitted from one section to the other.

From the foregoing, it is apparent that the novel construction of the end surfaces 29 and 32 of the male and female teeth 19 and 20 makes it possible to assemble the auger rapidly even in places where the parts are difficult to see. Since the rib ends 35 and 36 face circumferentially and extend beyond the ends of the cylindrical members 13 and 14, the torque which may be transmitted from one of the sections 10 and 11 to the other is substantially increased over that which may be transmitted by the spline coupling alone.

This application is a continuation-in-part of my application Serial No. 117,594, filed September 24, 1949.

I claim as my invention:

1. In a material boring auger, the combination of, a cylindrical tube one end of which constitutes a female element, a second cylindrical tube, a projection on one end of said second tube constituting a male element adapted to be received in telescoping relation in said female element, a plurality of axially extending internal spline teeth in said female element with their ends spaced inwardly from said first tube end and flaring outwardly toward the latter, a plurality of elongated external spline teeth and intervening grooves on said male element complementing said female teeth with each male tooth fitting snugly in a mating female groove to provide full surface contact between the corresponding teeth and grooves of the two elements, certain of said teeth and grooves having different widths circumferentially to permit telescoping of said elements together in only one predetermined angular position of the members, means on said female element defining a hole, a latch in said male element adapted to be received in said hole in said female element to lock the elements together in telescoped relation, the outer ends of said male teeth converging outwardly to seat against said female tooth ends and aline said male element axially with respect to said female element, and helical ribs on said tubes terminating adjacent the ends of the latter, the adjacent ends of said ribs being alined when said elements are locked together in said predetermined position.

2. In a material boring auger, the combination of, a cylindrical member one end of which is hollow to constitute a female element, a plurality of axially extending internal spline teeth and intervening grooves in said female element, a second cylindrical member, a projection on one end of said second cylindrical member constituting a male element adapted to be received in said female element, a plurality of elongated spline teeth and intervening grooves on said male element complementing said female teeth and grooves, each tooth on each element fitting snugly in a groove on the adjacent element to provide full surface contact between the corresponding teeth and grooves of the two elements and certain of said teeth and said grooves being different in circumferential width to fit together in telescoping relation in only one predetermined angular position of the elements, means on said female element defining a hole, a latch in said male element adapted to be received in said hole in said female element when the elements are telescoped together, helical ribs extending around said cylindrical members and terminating adjacent the end of the latter, the adjacent ends of said ribs being alined when said elements are telescoped together in said predetermined position, and complemental inclined surfaces on the adjacent ends of one of said elements coacting with each other to guide the entry of the male element and thus center the elements relative to each other.

3. In a material boring auger, the combination of, a cylindrical member one end of which is hollow to constitute a female element, a plurality of axially extending internal spline teeth and intervening grooves in said female element, a second cylindrical member, a projection on one end of said second cylindrical member constituting a male element adapted to be received in said female element, a plurality of elongated spline teeth and intervening grooves on said male element complementing said female teeth and grooves, complemental inclined surfaces on the adjacent ends of said male and female teeth coacting during insertion of said male element into said female element to relatively shift the elements transaxially and aline their axes, means on said female element defining a hole, a latch in said male element adapted to be received in said hole in said female element when the elements are telescoped together in a predetermined angular position, and helical ribs extending around said cylindrical members and terminating adjacent the ends of the latter.

References Cited in the file of this patent
UNITED STATES PATENTS

| Number | Name | Date |
|---|---|---|
| 389,335 | Spear | Sept. 11, 1888 |
| 1,281,049 | Menhall et al. | Oct. 8, 1918 |
| 1,533,619 | Thompson | Apr. 14, 1925 |
| 1,925,419 | Swenson | Sept. 5, 1933 |
| 2,045,757 | Constantin | June 30, 1936 |
| 2,210,296 | Kittrell et al. | Aug. 6, 1940 |
| 2,492,915 | Carlson | Dec. 27, 1949 |
| 2,588,901 | Weikart | Mar. 11, 1952 |

FOREIGN PATENTS

| Number | Country | Date |
|---|---|---|
| 295,554 | Great Britain | Aug. 16, 1928 |